(12) United States Patent
Govind et al.

(10) Patent No.: US 8,600,421 B2
(45) Date of Patent: Dec. 3, 2013

(54) METHOD AND APPARATUS FOR PRIORITY MONITORING OF COMMUNICATION GROUPS OVER MULTIPLE DISPARATE WIRELESS NETWORKS

(75) Inventors: Rema Govind, Schaumburg, IL (US); Daniel R. Loeger, Lake Forest, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 40 days.

(21) Appl. No.: 13/338,438

(22) Filed: Dec. 28, 2011

(65) Prior Publication Data

US 2013/0172037 A1    Jul. 4, 2013

(51) Int. Cl.
    *H04B 7/00*    (2006.01)
(52) U.S. Cl.
    USPC ........... 455/518; 455/519; 455/520; 455/517; 455/432.1; 455/435.3
(58) Field of Classification Search
    USPC ............ 455/518, 519, 520, 517, 432.1, 435.3
    See application file for complete search history.

(56) References Cited

U.S. PATENT DOCUMENTS

| | | | | |
|---|---|---|---|---|
| 5,214,790 | A | * | 5/1993 | Kozlowski et al. ........... 455/518 |
| 5,758,291 | A | * | 5/1998 | Grube et al. .................. 455/518 |
| 8,396,501 | B2 | * | 3/2013 | Trifiletti et al. ................ 455/518 |
| 2004/0203793 | A1 | * | 10/2004 | Dorenbosch .................. 455/445 |
| 2007/0197248 | A1 | | 8/2007 | Reich et al. |
| 2011/0143803 | A1 | | 6/2011 | Trifiletti et al. |
| 2011/0151917 | A1 | | 6/2011 | Mao et al. |
| 2011/0294512 | A1 | | 12/2011 | Khan et al. |

OTHER PUBLICATIONS

Schulzrinne, H. et al., "RTP: A Transport Protocol for Real-Time Applications," Network Working Group, Request for Comments 3550, Jul. 2003, pp. 89.
Postel, J., "User Datagram Protocol," RFC 768, pp. 4, Aug. 28, 1980.
PCT International Search Report Dated Mar. 27, 2013 for Counterpart Application PCT/US2012/069073.
Arthur L. Fumarolo, et al. "Method to Allow Legacy Subscriber Units to Operate in Interconnected Project 25 Trunked Radio Systems", IP.com Journal, IP.com Inc., NY, Jun. 13, 2007, XP013120909, ISSN:1533-0001.
"Push to Talk Over Cellular (PoC), V2.0 Architecture", Internet Citation, Feb. 14, 2006, XP002437218, Retrieved From the Internet URL:http://member.openmobilealliance.org/ftp/public_documents/POC/Permanent_documents/OMA-AD-PoC-V2_0-20060214-D.zip, Retrieved on Jun. 12, 2007.

* cited by examiner

*Primary Examiner* — Sanh Phu
(74) *Attorney, Agent, or Firm* — Kenneth A. Haas

(57) ABSTRACT

A client device performs a method for priority scanning of groups across multiple disparate connected networks which includes the client device creating a scan list having a designated priority group in response to user input that monitors the activity of a plurality of communication groups on a first wireless network that has a one-to-one mapping to a second plurality of logically equivalent communication groups provisioned on the multiple wireless networks. The client device also receives an indication from a communication server that a group on the scan list is active and automatically and preemptively joins the active group using resources on the first wireless network.

17 Claims, 3 Drawing Sheets

US 8,600,421 B2

METHOD AND APPARATUS FOR PRIORITY MONITORING OF COMMUNICATION GROUPS OVER MULTIPLE DISPARATE WIRELESS NETWORKS

FIELD OF THE DISCLOSURE

The present disclosure relates generally to wireless communications and more particularly to methods and apparatus for priority monitoring of communication groups existing on multiple disparate wireless networks.

BACKGROUND

Where wireless communication with a centralized command and control structure in needed to interconnect personnel in the field equipped with mobile and portable radios, such as Public Safety personnel, Land Mobile Radio (LMR) networks are often relied on. Standards have been developed to promote interoperability between different (i.e., disparate) digital radio communication networks, such as some LMR networks. For example, in North America, a suite of standards called Project 25 (also known in the art as P25 or APCO-25) was developed for digital radio communications, which enables communication between federal, state/province, and local Public Safety agencies that operate on different home P25 networks. Similar protocols have been developed in other countries, such as protocols defined in the Terrestrial Trunked Radio (TETRA) standard published by European Telecommunications Standards Institute (ETSI).

In coordinating communications, a user may desire to monitor multiple communication groups, such as multiple talkgroups. These communication groups can be groups for which the user is a member, and may span different agencies. For instance, in an emergency scenario, a Police Chief may be a member of a group of police officers called to the scene, and may be provisioned as a member of a group of all chiefs (e.g., police, fire, emergency medical, etc.) called to the scene, and the Police Chief may also be a member of other police groups that are not on the scene. The Police Chief may desire to monitor activity on all of these talkgroups. Moreover, typically, at least one of these groups is a "priority" group among all of the groups (for instance the group of police officers). In such a case, no matter what talkgroup the Police Chief is listening to at any given moment in time, if the priority group becomes active, the Police Chief would want to know and to ideally be automatically joined to the priority group. However, scanning or monitoring of communication groups, especially communication groups spanning different communication networks, is limited.

Accordingly, there is need for a method and apparatus for priority monitoring of communication groups over multiple disparate wireless networks.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
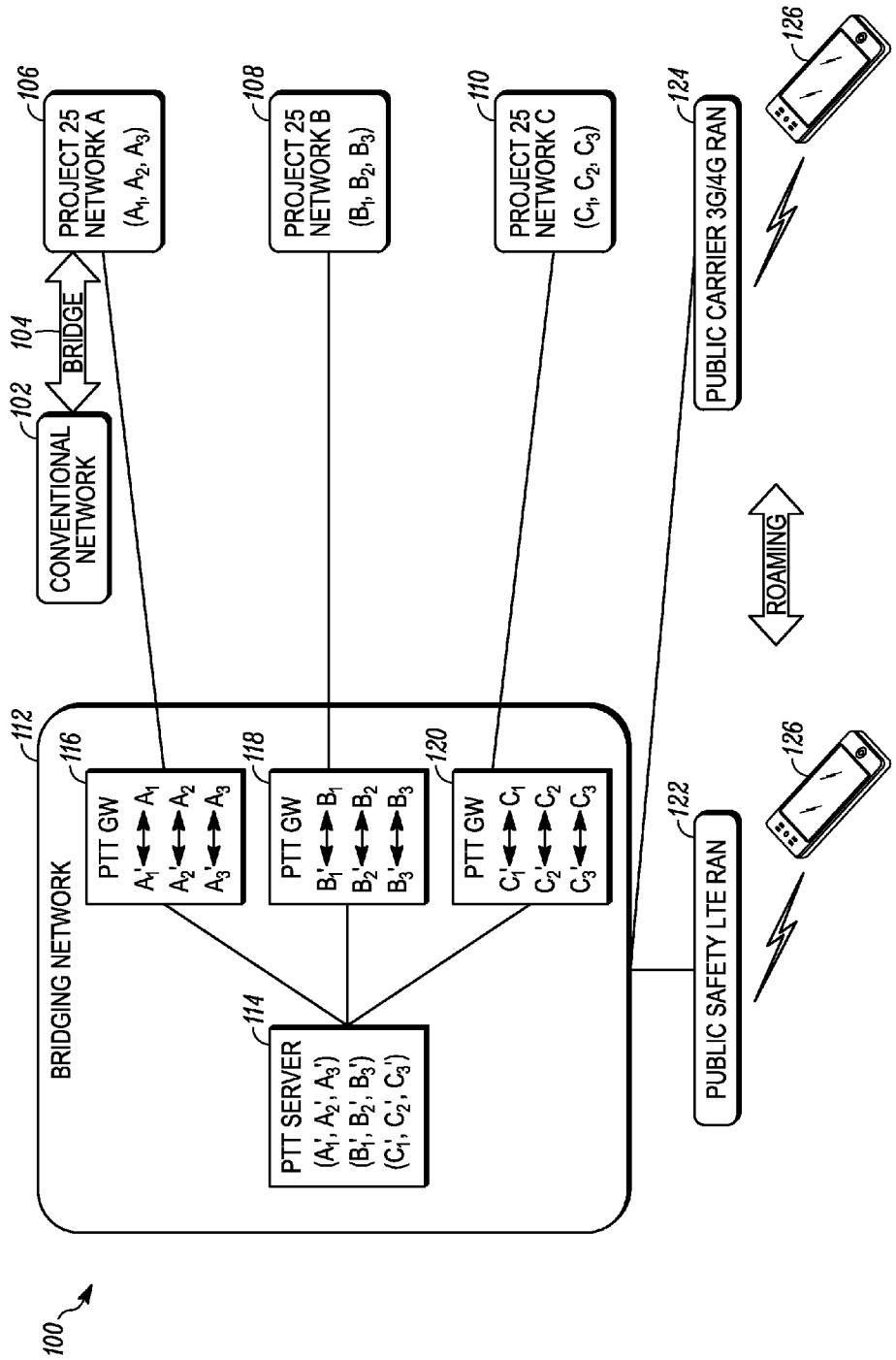
FIG. 1 illustrates a communication system implementing embodiments of the present teachings.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, the present disclosure provides a method and apparatus for monitoring and priority scanning multiple disparate wireless networks. In accordance with the teachings herein, a method for priority monitoring of communication groups over multiple wireless networks includes a client device receiving user input through a user interface of the client device and creating, in response to the user input, a scan list for monitoring activity of a first plurality of communication groups maintained on a communication server coupled to a first wireless network, wherein the first plurality of communication groups maps to a second plurality of communication groups provisioned on multiple wireless networks each coupled to the first wireless network, and wherein the scan list includes a priority communication group. Additionally, the client device receives a first indication from a communication server that a first communication group is active, wherein the first communication group maps to a second communication group, within the second plurality of communication groups, which is active on one of the multiple wireless networks. The client device also determines that the first communication group is on the scan list and responsively joins the active first communication group using resources on the first wireless network.

In one embodiment, for example, the client device, while joined to the active first communication group, receives a second indication that a third communication group is active, wherein the third communication group maps to a fourth communication group, within the second plurality of communication groups, which is active on one of the multiple wireless networks. The client device further determines that the third communication group is the priority communication group on the scan list, and responsively leaves the active first communication group and joins the active priority communication group using the resources on the first wireless network.

In another embodiment, the client device receives a first list of identifiers provisioned on the communication server, where each identifier in the first list has a one-to-one mapping to a corresponding identifier for a communication group on a second wireless network of the multiple wireless networks, wherein the second wireless network is a home wireless network of the client device. The client device additionally receives a second list of identifiers maintained on the communication server, where each identifier in the second list has a one-to-one mapping to a corresponding identifier for a communication group on a third wireless network of the multiple wireless networks. The embodiment also includes creating a scan list from at least a subset of the identifiers on both the first and second lists.

Further in accordance with the teachings herein, an apparatus for priority monitoring of communication groups on multiple disparate Project 25 networks includes a user interface adapted to receive user input designating a scan list for monitoring activity of a first plurality of communication groups maintained on a communication server coupled to a wireless network, wherein first plurality of communication groups have a one-to-one mapping to a second plurality of communication groups provisioned on the multiple disparate Project 25 networks, and wherein the processing device is further adapted to designate a communication group on the scan list as a first priority communication group that maps to a second priority communication group on a home network of the client device, wherein the home network is one of the multiple wireless networks. Further, the apparatus includes a network interface adapted to receive a first indication from the communication server that a first communication group is active, wherein the first communication group maps to a second communication group, within the second plurality of communication groups, which is active on one of the multiple disparate Project 25 networks, wherein the processing device is further adapted to determine that the first communication group is on the scan list, and to responsively join the active first communication group using resources on the wireless network.

In a particular embodiment, the communication server is a push-to-talk server, and the scan list comprises a first plurality of identifiers that identify the first plurality of communication groups, wherein the first plurality of identifiers has a one-to-one mapping to a second plurality of push-to-talk talkgroup identifiers that identify the second plurality of communication groups.

Also in accordance with the teachings herein, is a non-transient computer-readable storage element with computer-readable code stored thereon for programming a computer to perform a method for priority monitoring of communication groups over multiple wireless networks. The method includes receiving user input through a user interface and creating, in response to the user input, a scan list for monitoring activity of a first plurality of communication groups provisioned on a communication server coupled to a first wireless network, wherein the first plurality of communication groups maps to a second plurality of communication groups provisioned on multiple wireless networks each coupled to the first wireless network, and wherein the scan list includes a first priority communication group that maps to a second priority communication group on a home network of the client device, wherein the home network is one of the multiple wireless networks. The method also includes receiving, from the communication server, a first indication that a first communication group is active, wherein the first communication group maps to a second communication group, within the second plurality of communication groups, which is active on one of the multiple wireless networks. Additionally, the method includes determining that the first communication group is the first priority communication group on the scan list, and responsively joining the active first priority group using resources on the first wireless network.

Referring now to the drawings, and in particular FIG. 1, a communication system implementing embodiments in accordance with the present teachings is shown and indicated generally at 100. System 100 comprises: a bridging network 112 having a Push-to-Talk (PTT) server 114 and three PTT gateways (GW) 116-120; three disparate (i.e., different) Project 25 (P25) networks 106-110; a conventional network 102 coupled to P25 network 106 via a network bridge 104; a Public Safety Long Term Evolution (LTE) Radio Access network (RAN) 122; a public carrier RAN 124, wherein the infrastructure devices operate in compliance with 3rd or 4th generation wireless technology; and a client device 126. Only a limited number of elements 102, 104, 106, 108, 110, 112, 114, 116, 118, 120, 122, 124 and 126 are shown for ease of illustration, but additional such elements may be included in the communication system 100. Moreover, other components needed for a commercial embodiment of system 100 are omitted from the drawings for clarity in describing the enclosed embodiments.

We now turn to a brief description of the system elements within the communication system 100, for which example communication networks are shown. These examples, however, are merely illustrative, and the scope of the teachings herein is not limited by the types of wireless communication technologies implemented in the networks. For example, networks 106, 108, and 110 are shown as P25 networks. However, networks 106-110 can be any network that provides for trunked radio communications, wherein dedicated channels are not assigned to communication groups provisioned on the network. Instead, a control channel is used to assign channels (from a pool of channels) to the communication groups as needed. In another embodiment, for instance, the networks 106-110 are TETRA networks. In addition, networks 122 and 124 can use any wireless technology that enables broadband and Internet Protocol (IP) communications including, but not limited to, $3^{rd}$ Generation (3G) wireless technologies such as CDMA2000 and Universal Mobile Telecommunications System (UMTS) networks) or $4^{th}$ Generation (4G) or pre-4G wireless networks such as LTE and WiMAX. Moreover, the network 102 can be any conventional radio network that assigns dedicated channels (i.e., frequencies) to each communication group provisioned on the network.

Networks 102-110 are each termed herein as "disparate" or "different" networks. The term "disparate" means that each of the P25 networks is distinct in the sense that it is separate from the others and capable of operating independently. The term is not meant to suggest or imply that the communications networks must be distinctive in character or fundamentally dissimilar from one another, although this possibility is not excluded. Each network 102-110 has provisioned thereon a plurality of communication groups, wherein the members of the communication groups are authorized for communications using the network. Each network could, for example, have different system administrators and serve a different public agency. A "communication group," also referred to herein as simply a "group," is defined as having a plurality of provisioned members that are authorized to engage in mutual communication with each other while being joined to an active communication session associated with the group. A communication group wherein voice media is communicated between the members is known as a talkgroup, but communication groups can be created to communicate any type of media between the members.

A system administrator creates the groups and provisions the groups into the relevant network infrastructure elements. For example, each P25 network is a "home" network for some LMR radio-capable client devices, wherein the home network is the network that maintains subscription information for the users of those devices (and the devices themselves) operating on the network. Additionally, each P25 network maintains information for provisioned client devices that are authorized to access the network when roaming.

Each of the created groups is uniquely identified by a set of identifiers or IDs (e.g., alpha-numeric characters), that are associated with it. Talkgroup $A_1$, for example, is identified as belonging to Network A by a network ID; a separate talkgroup ID identifies that particular talkgroup as being Talkgroup $A_1$ on that network; and finally, the individual IDs associated with the talkgroup identify the individual members of that group. Members of a communication group are those entities, as identified for example by communication device IDs or in some embodiments by user IDs or both, which are authorized to participate in a communication session involving that group. This information is programmed into the PTT GW connected to the network. Where the meaning is clear from context, "members" and "devices" are sometimes used interchangeably herein. Further, language indicating that a user of a device is a provisioned member of a communication group is interchangeably used herein with language indicating that the user's device is the provisioned member of the communication group, and the user is referred to as the member by virtue of the user operating the provisioned device.

For each P25 network, a system administrator provisions talkgroups on the P25 network (for example on a communication server, e.g., a PTT server within the network (not shown), which manages communication sessions for talkgroups, and/or on a system controller that assigns talkgroup channels) and designates some of the talkgroups as priority talkgroups. By marking a talkgroup as a priority group on the network, the system administrator enables the P25 network to keep track of when the priority groups become active and to signal this to the users' client devices within designated fields of assigned voice channels. Accordingly, while a user is on her home network and as a consequence of priority scanning, regardless of whether the user is currently listening to a non-priority talkgroup, the user's client device is made aware of activity on the user's priority group when that group becomes active. The client device thereby leaves an existing group to preemptively join a session involving the priority talkgroup. However, when the user roams away from her home network, the user cannot use the priority scanning feature and, therefore, has no ability in the prior art to be alerted that her priority talkgroup on her home network has become active. By contrast, the current teachings enable a user to monitor, across disparate networks, any talkgroups to which the user is a member including priority talkgroups on the user's home network.

As can be seen by reference to FIG. 1, a system administrator for network 106 has provisioned communication groups $A_1$, $A_2$, and $A_3$ on network 106. A system administrator for network 108 has provisioned communication groups $B_1$, $B_2$, and $B_3$ on network 108; and a system administrator for network 110 has provisioned communication groups $C_1$, $C_2$, and $C_3$ on network 110. Let's say for purposes of this particular illustrative example that a user with an LMR-capable device is a provisioned member of talkgroups $A_1$, $A_2$, and $A_3$ on network 106 (which is the home network of the user), where Talkgroup $A_1$ is the priority talkgroup. Accordingly, when the user is operating her device while connected to her home network 106, the user can participate in sessions involving $A_1$, $A_2$, and $A_3$ and can priority scan for Talkgroup $A_1$. In addition, the user of device is a provisioned member of talkgroups $B_1$, $B_2$, and $B_3$ on network 108, which is a foreign network of the user. Accordingly, when the user is operating her device while connected to foreign network 108, the user can participate in sessions involving talkgroups $B_1$, $B_2$, and $B_3$ but cannot priority scan her home priority talkgroup $A_1$.

In accordance with the present disclosure, however, the bridging network 112 enables the user of the client device 126 to participate in sessions involving the talkgroups $A_1$, $A_2$, $A_3$, $B_1$, $B_2$, and $B_3$ even when the client device is not connected to and operating on the respective networks 106 and 108 on which the talkgroups are provisioned. This is accomplished through mappings within the PTT GWs and the PTT server. In other words, in accordance with disclosed embodiments, as long as the client device 126 is connected to and operating on a network where the client device can access the PTT server 114 (e.g., networks 122 and 124), the client device 126 can monitor and participate in active sessions for any of the groups on any of the networks 102-110 for which its user is a member.

More particularly, as stated earlier, the bridging network includes the PTT server 114 and the PTT GWs 116, 118, and 120. Although shown as a server that facilitates and manages sessions for PTT services, the server 114 can be any communication server, e.g., an IP-based communication server, which manages and facilitates communication sessions for communication groups maintained, provisioned, or programmed on the server. Each PTT GW 116-120 serves as a conduit or go-between which maps talkgroups provisioned on the P25 network connected with it to aliases or images of those talkgroups which are maintained on the PTT server 114. For example, PTT GW 116 maps Talkgroup $A_1$ provisioned on Network A 106 to a Talkgroup $A_1'$ maintained on the PTT server 114. The talkgroup $A_1'$ can be either created by PTT GW 116 or provisioned on PTT GW 116. As a result of the mapping, Talkgroup $A_1'$ is communicated, along with its membership, to the PTT server 114. While Talkgroup $A_1'$ is given its own set of physical identifiers that distinguish it from Talkgroup $A_1$, the two groups are logically equivalent.

The remaining talkgroups of Network A 106, and those of Networks B 108 and C 110, are all mapped by the GWs 116-120 associated with those networks 106-110 to their respective counterparts on the PTT server 114 within the bridging network 112 in a similar fashion. The mapping is one-to-one in that each group on the PTT server 114 maps to exactly one unique communication group provisioned on the P25 networks 106-110. In this way, the PTT server 114 collectively provides all of the talkgroups provisioned on the disparate P25 networks 106-110 to users connected to the bridging network 112. While only nine mapped groups are shown for this illustrative example, the actual number of available groups is generally greater.

In addition to talkgroups from trunked networks, communication groups from conventional networks, Network 102 serving as an immediate example, are also made available to users of the bridging network 112. Shown at 104 is a network bridge that allows for conventional communication groups provisioned on Network 102 to be "patched through" to Network A 106. From there, the conventional communication groups can be mapped by PTT GW 116 to their respective groups on the PTT server 114.

It is an additional function of the PTT GWs 116-120 to facilitate the movement of media traffic between each of the disparate networks 106-110 and the bridging network 112. Where a messaging protocol being used by one of the disparate networks differs from the protocol being used by the bridging network, the associated PTT GW translates between the two protocols so that the media flow is uninterrupted. For example, Network A 106 might be using Real-time Transport Protocol (RTP), as defined in Internet Engineering Task Force (IETF) Request for Comments (RFC) 3550 dated July 2003, which defines a standardized packet format for delivering media over IP networks which is optimized for timely delivery. The bridging network 112, on the other hand, might be utilizing User Datagram Protocol (UDP) for the delivery of data packets, as defined by IETF RFC 768 dated August 1980. In this situation, the PTT GW 116 performs a protocol translation function so that all data packets arrive at their respective networks in a decipherable form.

One distinct advantage of the mapping process is that on the broadband side, all the communication groups are available on frequencies (those of the broadband network's RAN) that are accessible to the client device. However, without these teachings, it might be the case that several different devices would be required if the disparate networks 102, 106-110 were monitored independently because each may be operating on different frequency bands. A network transmitting in Ultra-High Frequency (UHF), for example, would be inaccessible to a radio designed to receive only Very-High Frequency (VHF) transmissions.

The PTT server 114 connected to the bridging network 112 makes the associations between the individual communication groups it maintains and the multiple users associated with each of those groups. Users are able to access the communication groups using networks connected to the bridging network 112. For example, a user's communication device, hereinafter called a "client device," might be connected to a dedicated 700 MHz Public-Safety broadband network by means of a Public-Safety LTE RAN shown at 122, which, in turn, is interconnected to the bridging network 112. Alternatively, as shown at 124, the client device might use a public carrier 3G/4G RAN to gain access to a commercial network, which is connected to the bridging network 112. Connectivity to the bridging network 112 may also be extended where the client device 126 has the ability to roam and gain access through other networks. Additionally, and as a consequence of the present teachings, users can monitor communication groups maintained on the PTT server 114 without using the narrowband resources of the P25 networks on which the groups are provisioned.

The client device itself, shown at 126, may be any one of a number of devices commonly referred to in the art as mobile devices, access devices, access terminals, mobile stations, mobile subscriber units, subscriber units, user devices, and the like, which can be radios, mobile phones, mobile data terminals, Personal Digital Assistants (PDAs), laptops, desktop computers, two-way radios, cell phones, or any other type of similar electronic device. The client device 126 performs the methods described throughout these teachings, which include messaging with the PTT server 114 and priority monitoring communication groups over multiple disparate P25 networks 106-110. "Priority monitoring" is the ability of a client device to continuously or periodically check for activity on a designated priority communication group without being prompted by user input while simultaneously monitoring one or more other communication groups. To accomplish this, the client device 126, which is also referred to herein as an "apparatus," comprises a processing device (not shown), interchangeably referred to herein as a "computer," which may be programmed, for example, via a non-transient computer-readable storage element having computer-readable code stored thereon.

In general, the PTT GWs 116-120 and PTT server 114, belonging to the bridging network 112, and the client device 126 are adapted with functionality in accordance with embodiments of the present disclosure as described in detail below with respect to the remaining figures. Being "adapted" or "configured" means that such elements are implemented using one or more (although not shown) memory devices, network interfaces, and/or processing devices that are operatively coupled. The memory devices, network interfaces, and/or processing devices, when programmed, form the means for these system elements to implement their desired functionality.

The network interfaces are used for passing signaling, also referred to herein as messaging (e.g., messages, packets, datagrams, frames, superframes, and the like), containing control information, voice or non-voice media between the elements of the systems 100. The implementation of the network interface in any particular element depends on the particular type of network, i.e., wired and/or wireless, to which the element is connected. For example, the client devices 126 contain wireless interfaces to connect with the bridging network 112, and there may be wired interfaces between the PTT server 114 and infrastructure devices contained in the bridging network 112.

Where the networks support wireless communications, the network interfaces comprise elements including processing, modulating, and transceiver elements that are operable in accordance with any one or more standard or proprietary wireless interfaces, wherein some of the functionality of the processing, modulating, and transceiver elements may be performed by means of the processing device through programmed logic such as software applications or firmware stored on the memory device of the system element or through hardware. Examples of wired interfaces include Ethernet, T1, USB interfaces, etc.

The processing devices utilized by the elements of system 100 may be partially implemented in hardware and, thereby, programmed with software or firmware logic or code for performing functionality described by reference to FIGS. 2 and 3; and/or the processing devices may be completely implemented in hardware, for example, as a state machine or ASIC (application specific integrated circuit). The memory implemented by these system elements can include short-term and/or long-term storage of various information needed for the functioning of the respective elements. The memory may further store software or firmware for programming the processing device with the logic or code needed to perform its functionality.

Figure 2:
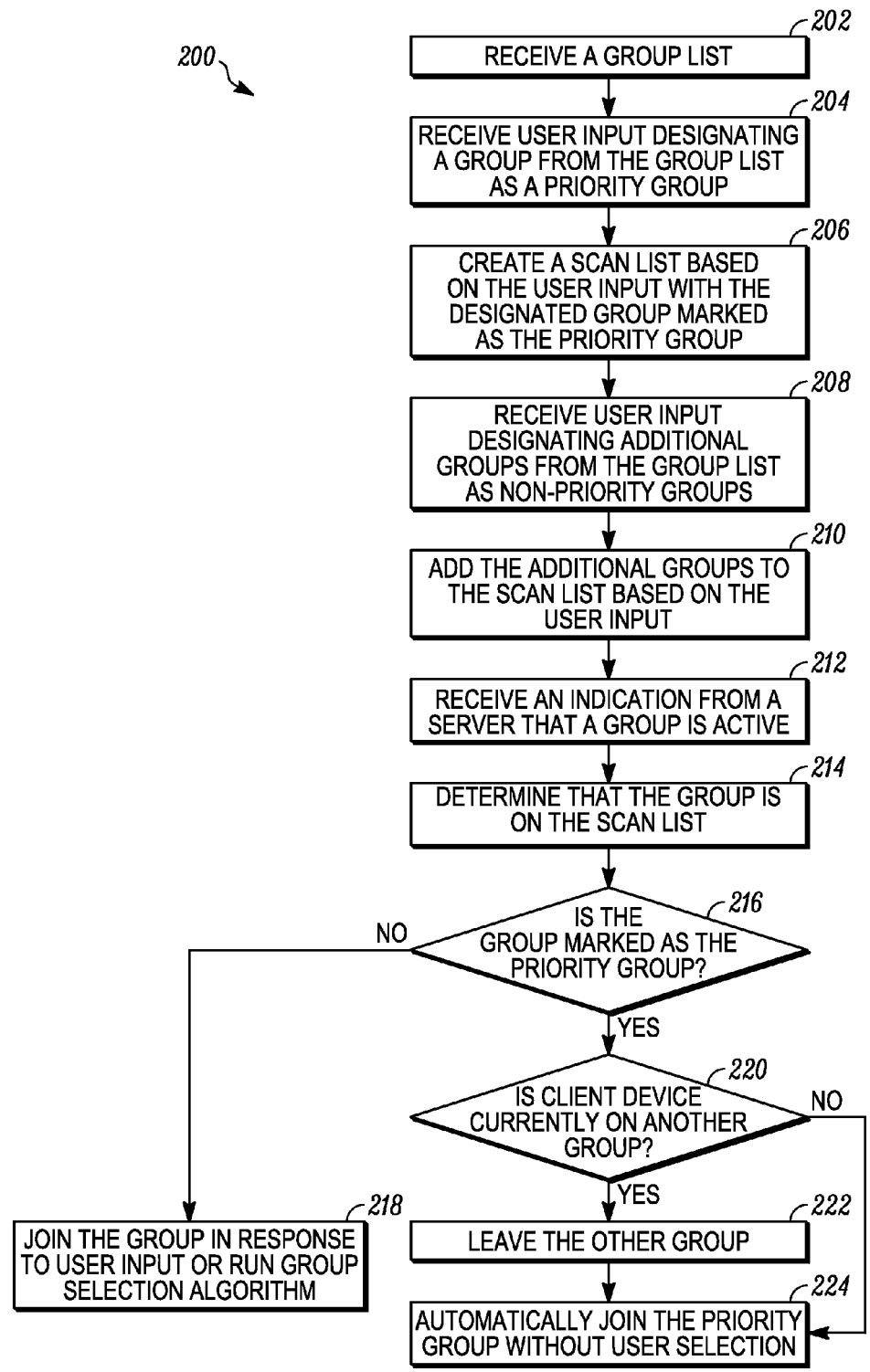
FIG. 2 is a logical flowchart illustrating the creation of a scan list and monitoring of groups on the scan list in accordance with some embodiments of the present teachings.

The flow diagram depicted by FIG. 2 illustrates the response of the client device 126 to user input and messages received from the communication server 114 in accordance with an embodiment that is consistent with the teachings herein. To communicate and receive input, the client device 126 comprises one or more interfaces (not shown). These interfaces include a network interface, through which the client device may exchange messages with the PTT server 114 or other entities associated with the bridging network 112, and a user interface, through which the client device 126 may communicate information to and receive information from a user of the device. For example, a client device can communicate information to a user through the use of a speaker or visual display, and it may receive input from the user via a keypad, touch screen, voice interface, control knobs, or other such mechanism.

Figure 3:
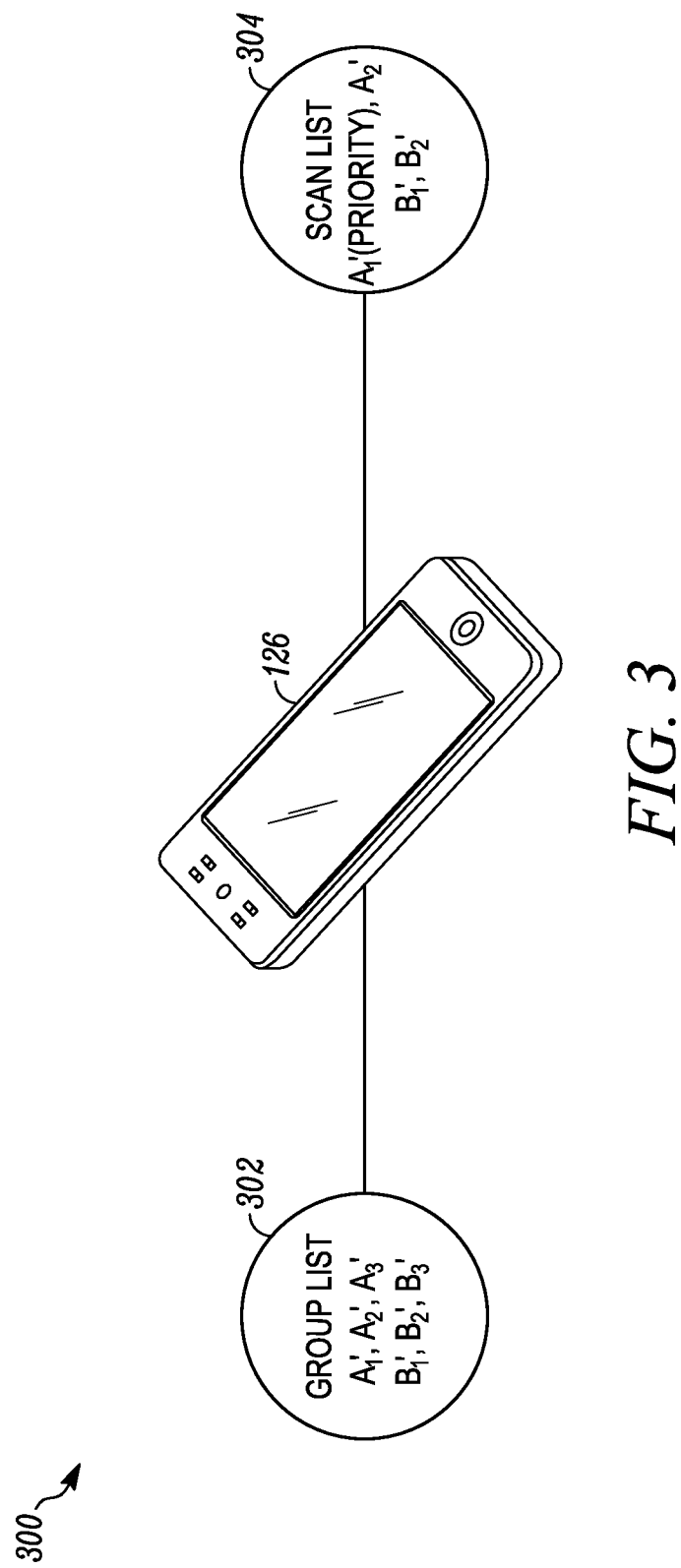
FIG. 3 is an exploded view of a client device illustrating a scan list that was created in accordance with some embodiments of the present teachings.

Proceeding with a particular description of a method 200 shown in FIG. 2 in view of FIG. 3, the client device 126 receives (202) a group list 302 of accessible communication groups residing on the server 114 from which groups may be chosen to populate a scan list 304. Through its user interface, the client device 126 communicates the group list 302 to a user and responsively receives (204) user input (which in this embodiment places the client device 126 in a programming mode) designating a group from the group list 302 to be the priority group for the scan list 304. At 206, the client device 126 creates the scan list 304 based on the user input it received and marks the designated group as the priority group. The user-selected priority communication group has elevated importance relative to other groups placed on the scan list 304 as indicated below. At 208, the client device 126 receives further user input designating additional groups on the group list 302, which the client device places (210) on the scan list 304. A user may program (208) these additional groups into the scan list 304 in any order, either immediately after designating a priority group, or at a later time by again accessing the programming mode on the client device 126. The programming mode may be used repeatedly to add or remove communication groups from the scan list 304, or to rearrange the communication groups on the scan list 304.

Turning momentarily to FIG. 3, this drawing illustrates an exploded view 300 of the client device 126 showing the group list 302 and the scan list 304 stored on that device. The group list 302 is downloaded to the client device 126 over the air via the PTT server 114, and it comprises a list of identifiers that identify communication groups the server 114 maintains. The group list exemplified at 302 shows that six of the nine communication groups on the server 114 are available to the client device, namely $A_1'$, $A_2'$, $A_3'$, $B_1'$, $B_2'$ and $B_3'$. From these six groups, a user selects a subset of groups for programming into the scan list 304, and inputs those selections into the client device 126 using the user interface. As used herein, a "subset" is defined to include one or more elements. The scan list is the list of communication groups that is monitored or scanned by the client device. The scan list exemplified at 304 shows that four of the six groups accessible to the client device 126 were placed on the scan list, namely $A_1'$, $A_2'$, $B_1'$ and $B_2'$, with communication group $A_1'$ being designated by the user as the priority group. FIG. 3 only illustrates a single scan list created on the client device 126. However, the user may create multiple such scan lists, each designating and having associated therewith a priority group. This makes it very convenient for the user to assign priority in multiple ways and support the user's need to monitor different communication groups at different times.

Turning again to method 200, at 212, the client device 126 receives through its network interface an indication from the server 114 that a group has become active. Where Group $A_1$ becomes active, for example, the PTT server 114 receives an indication of such from the PTT GW 116 and transitions the status of Group $A_1'$ from inactive to active. It then determines which communication devices belong to (i.e., are members of) Group $A_1'$ and sends out messages to those devices indicating that Group $A_1'$ is currently active. In some instances, a particular communication device belonging to a group may be turned off or outside of the network's 112 coverage area. When that communication device is registered with the server 114 after connecting to the network 112, it receives one or more messages indicating all of its member groups that are currently active, including Group $A_1'$ if that session is still ongoing. Where a broadband device has been continuously connected to the network 112, it receives messages from the server 114 one at a time as the individual member groups for that device become active. Each message, however, might comprise a complete list of all active communication groups for which the recipient of the message is a member.

While the status indication received at 212 takes the form of a message, no specific limitation is placed on the specific type of message or protocol used to send it. For example, the message may be sent using a particular session management protocol, such as Session Initiation Protocol (SIP), a protocol which is defined by the IETF standards organization. A SIP NOTIFY message is an example message using the SIP protocol that could be used to communicate the status indication 212 from the server 114 to the client device 126.

At 214, the processing device within the client device 126 determines that the active group indicated at 212 is a group that is on the scan list 304. A determination (216) of whether the active group is the same group that is marked as the priority group within the scan list 304 (e.g., Group $A_1'$, as indicated in FIG. 3) is also made at the client device 126. Where the active group is determined (216) by the client device 126 to be the priority communication group, the client device preemptively joins that group. Preemptive joining involves the client device 126 determining (220) if it is currently on another group. If it is not on another group, the client device 126 is joined automatically to the priority communication group without any user selection, at 224. Where the client device 126 is on another group, it immediately leaves that group, at 222, in response to determining that the active group noticed at 212 is the priority group and is automatically joined to the priority group, at 224.

Joining is the process by which a client device is brought into an active communication session associated with a group so that it may exchange voice or media with other devices joined to the session. A client device leaves a session when it is disassociated from it, usually in response to user input, and its logical connection to the session is dissolved so that the client device no longer retains its ability to exchange voice or media transmissions with those devices that remain joined to the session. Joining and leaving a session is performed, for example, using a session management protocol such as SIP.

Where the client device 126 determines (216) that the active group indicated at 212 is not the priority group, it might, at 218, join the group in response to user input, or in the alternative, it might respond as directed by a group selection algorithm, in which case all the active groups on the scan 304 list have a relative priority to each other depending on how the group selection algorithm is programmed. For example, based on a first-in/first-out algorithm, the client device 126 might be participating in an active session involving Group $B_1'$ when it receives (212) an indication that Group $B_2'$ is active. Thereafter, and before the client device 126 has left the active session involving Group $B_1'$, the client device 126 receives an additional message indicating that Group $A_2'$ is active. When the client device leaves the session involving Group $B_1'$ it is automatically joined to the active session for Group $B_2'$ because the client device 126 received an indication that Group $B_2'$ became active before it received such an indication for Group $A_2'$.

As an alternate example, the active group indicated at 212 may be the non-priority group $A_2'$, but at the time the message is received, the client device 126 might already be participating in an active session involving Group $B_1'$ while Group $B_2'$ is also active. The selection algorithm could be programmed to assign a higher preference to Group $A_2'$ over Groups $B_1'$ and $B_2'$ where Group $A_2'$ appears before Groups $B_1'$ and $B_2'$ in the scan list 304 (as indicated with reference to FIG. 3). The group selection algorithm would then direct the client device 126 to automatically join the active session for Group $A_2'$ over the session for Group $B_2'$ after the client device 126 left the session associated with Group $B_1'$.

The "group selection algorithm" or "scanning algorithm," is contained in the client device 126 and is programmable by the user of the device 126. The scanning algorithm, for example, might be programmed to scan thorough the active groups on the scan list 304 in the order in which they appear, spending a fixed amount of time on each, or it might be set to responsively (i.e., automatically) join active groups in the order they became active, or in their programmed order, when the server 114 indicates that multiple groups are active, as indicated above. The term "active" is used to indicate that a communication session involving a group is presently taking place, wherein members of the group participating in the session are exchanging media with one another. A group becomes inactive after a communication session ends and all participants have left. Generally, a session management protocol such as SIP is used to start (i.e., initiate) and terminate (i.e., end) a session. Joining an active communication group means that a client device is connected to the in-progress communication session that is associated with that group so the user of the client device may participate in the ongoing communication session.

The teachings herein illustrate how the client device 126 priority scans or monitors communication groups over multiple wireless networks, like the ones indicated in FIGS. 1 at 102, 106, 108 and 110. Because the communication groups that exist on the scan list 304 of the client device 126 (which can be either monitored or scanned by the group selection algorithm) map to communication groups provisioned by the multiple disparate wireless networks indicated above, the client device 126 performs a "system" scan, but with many illustrative novel benefits. For instance, the client device 126 can always monitor its priority group, and is joined to it preemptively the moment it becomes active. Additionally, a user can use her client device 126 to mark her own priority group, and that priority group may be on any network, not just her home network. Further, logic built into the client device 126 allows a user to scan or just passively monitor those groups the user has placed on her scan list 304 which are presently active. There is no longer a need to scan through inactive groups, which may be skipped, because the client device 126 is always kept current on which groups are active by the server 114.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . , a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium (i.e., element) having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for priority monitoring of communication groups over multiple wireless networks, the method comprising a client device performing:
- receiving user input through a user interface of the client device;
- creating, in response to the user input, a scan list for monitoring activity of a first plurality of communication groups maintained on a communication server coupled to a first wireless network, wherein the first plurality of communication groups maps to a second plurality of communication groups provisioned on multiple wireless networks each coupled to the first wireless network, wherein the scan list includes a priority communication group;
- receiving, from the communication server, a first indication that a first communication group is active, wherein the first communication group maps to a second communication group, within the second plurality of communication groups, which is active on one of the multiple wireless networks;
- determining that the first communication group is on the scan list, and responsively joining the active first communication group using resources on the first wireless network.

2. The method of claim 1, wherein the first communication group is a non-priority group on the scan list, the method further comprising:
- while joined to the active first communication group, receiving a second indication that a third communication group is active, wherein the third communication group maps to a fourth communication group, within the second plurality of communication groups, which is active on one of the multiple wireless networks;
- determining that the third communication group is the priority communication group on the scan list, and responsively leaving the active first communication group and joining the active priority communication group using the resources on the first wireless network.

3. The method of claim 2, wherein the active priority communication group is automatically joined without user selection.

4. The method of claim 1, wherein the scan list comprises a first plurality of identifiers that identify the first plurality of communication groups, wherein the first plurality of identifiers maps to a second plurality of push-to-talk talkgroup identifiers that identify the second plurality of communication groups.

5. The method of claim 1, wherein the priority communication group on the scan list maps to a priority communication group on a home network of the client device, wherein the home network is one of the multiple wireless networks.

6. The method of claim 1, wherein the first indication comprises a Session Initiation Protocol (SIP) message that identifies the first communication group and that provides a status indication of active for the first communication group.

7. The method of claim 6, wherein the SIP message is a SIP NOTIFY message.

8. The method of claim 1 further comprising:
- receiving, into the client device, a first list of identifiers provisioned on the communication server, each identifier in the first list having a one-to-one mapping to a corresponding identifier for a communication group on a second wireless network of the multiple wireless networks, wherein the second wireless network is a home wireless network of the client device;
- receiving, into the client device, a second list of identifiers maintained on the communication server, each identifier in the second list having a one-to-one mapping to a corresponding identifier for a communication group on a third wireless network of the multiple wireless networks,
- wherein the scan list is created from at least a subset of the identifiers on both the first and second lists.

9. An apparatus for priority monitoring of communication groups on multiple disparate Project 25 networks, the apparatus comprising:
- a user interface adapted to receive user input;
- a processing device adapted to, in response to the user input, designate a scan list for monitoring activity of a first plurality of communication groups maintained on a communication server coupled to a wireless network, wherein first plurality of communication groups have a one-to-one mapping to a second plurality of communication groups provisioned on the multiple disparate Project 25 networks, and wherein the processing device is further adapted to designate a communication group on the scan list as a first priority communication group that maps to a second priority communication group on a home network of the client device, wherein the home network is one of the multiple disparate Project 25 networks;
- a network interface adapted to receive a first indication from the communication server that a first communication group is active, wherein the first communication group maps to a second communication group, within the second plurality of communication groups, which is active on one of the multiple disparate Project 25 networks;
- wherein the processing device is further adapted to determine that the first communication group is on the scan list, and to responsively join the active first communication group using resources on the wireless network.

10. The apparatus of claim 9:
- wherein the first communication group is a non-priority communication group;
- wherein the network interface is further adapted to receive a second indication that a third communication group is active, wherein the third communication group maps to a fourth communication group, within the second plurality of communication groups, which is active on one of the multiple disparate Project 25 networks;
- wherein the processing device is further adapted to determine that the third communication group is the first priority communication group on the scan list, and to responsively leave the active first communication group and automatically join the active first priority communication group using the resources on the wireless network.

11. The apparatus of claim 9:
- wherein the communication server is a push-to-talk server; and
- wherein the scan list comprises a first plurality of identifiers that identify the first plurality of communication groups, wherein the first plurality of identifiers has a one-to-one mapping to a second plurality of push-to-talk talkgroup identifiers that identify the second plurality of communication groups.

12. A non-transient computer-readable storage element having computer-readable code stored thereon for programming a computer to perform a method for priority monitoring of communication groups over multiple wireless networks, the method comprising:

receiving user input through a user interface;

creating, in response to the user input, a scan list for monitoring activity of a first plurality of communication groups maintained on a communication server coupled to a first wireless network, wherein the first plurality of communication groups maps to a second plurality of communication groups provisioned on multiple wireless networks each coupled to the first wireless network, wherein the scan list includes a first priority communication group that maps to a second priority communication group on a home network of the client device, wherein the home network is one of the multiple wireless networks;

receiving, from the communication server, a first indication that a first communication group is active, wherein the first communication group maps to a second communication group, within the second plurality of communication groups, which is active on one of the multiple wireless networks;

determining that the first communication group is the priority communication group on the scan list, and responsively joining the active first priority group using resources on the first wireless network.

13. The non-transient computer-readable storage element of claim 12, wherein the code stored thereon further programs the computer to perform:

prior to receiving the first indication, receiving a prior indication that a third communication group is active, determining the third communication group is a non-priority group on the scan list, and joining the active third communication group;

wherein the active first communication group is preemptively joined over the active third communication group.

14. The non-transient computer-readable storage element of claim 12, wherein the code stored thereon further programs the computer to perform:

receiving, into the client device, a first list of identifiers provisioned on the communication server, each identifier in the first list having a one-to-one mapping to a corresponding identifier for a communication group on a second wireless network of the multiple wireless networks, wherein the second wireless network is a home wireless network of the client device;

receiving, into the client device, a second list of identifiers provisioned on the communication server, each identifier in the second list having a one-to-one mapping to a corresponding identifier for a communication group on a third wireless network of the multiple wireless networks, wherein the scan list is created from at least a subset of the identifiers on both the first and second lists.

15. The non-transient computer-readable storage element of claim 12, wherein the scan list comprises a first plurality of identifiers that identify the first plurality of communication groups, wherein the first plurality of identifiers maps to a second plurality of push-to-talk talkgroup identifiers that identify the second plurality of communication groups.

16. The non-transient computer-readable storage element of claim 12, wherein the first indication comprises a Session Initiation Protocol (SIP) message that identifies the first communication group and that provides a status indication of active for the first communication group.

17. The non-transient computer-readable storage element of claim 16, wherein the SIP message is a SIP NOTIFY message.

* * * * *